Dec. 30, 1930.          F. J. ZALESKY                1,787,228
                    AGRICULTURAL IMPLEMENT
                   Filed Jan. 28, 1927          12 Sheets-Sheet 1
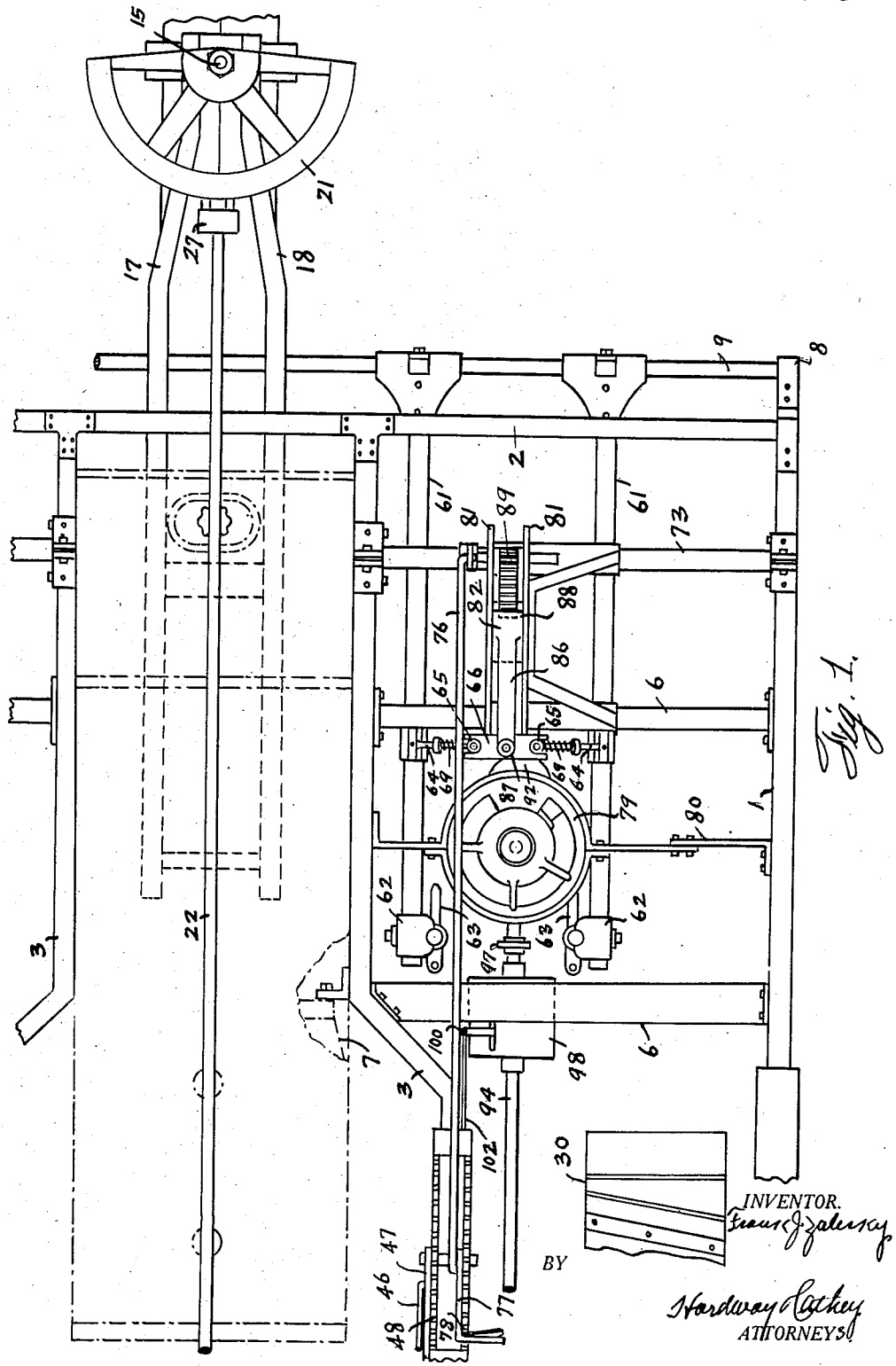

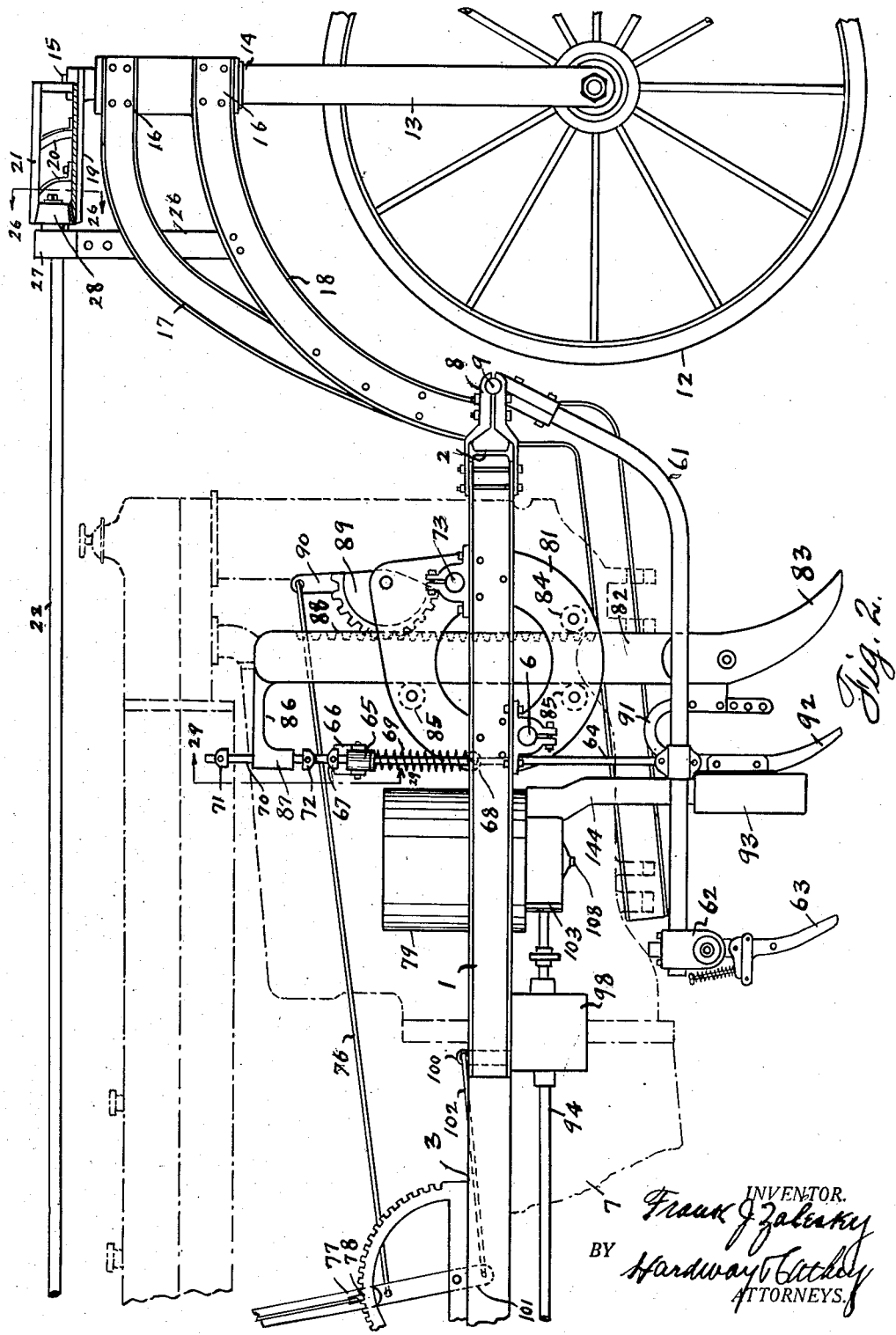

Dec. 30, 1930.  F. J. ZALESKY  1,787,228
AGRICULTURAL IMPLEMENT
Filed Jan. 28, 1927  12 Sheets-Sheet 3
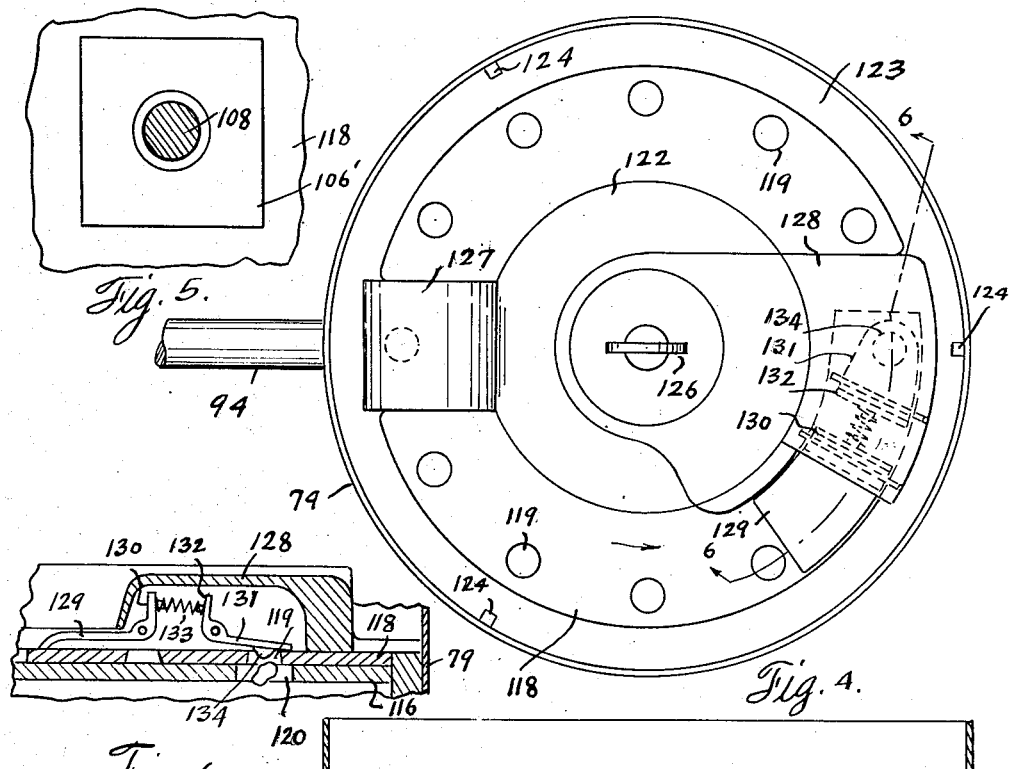
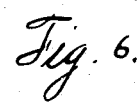
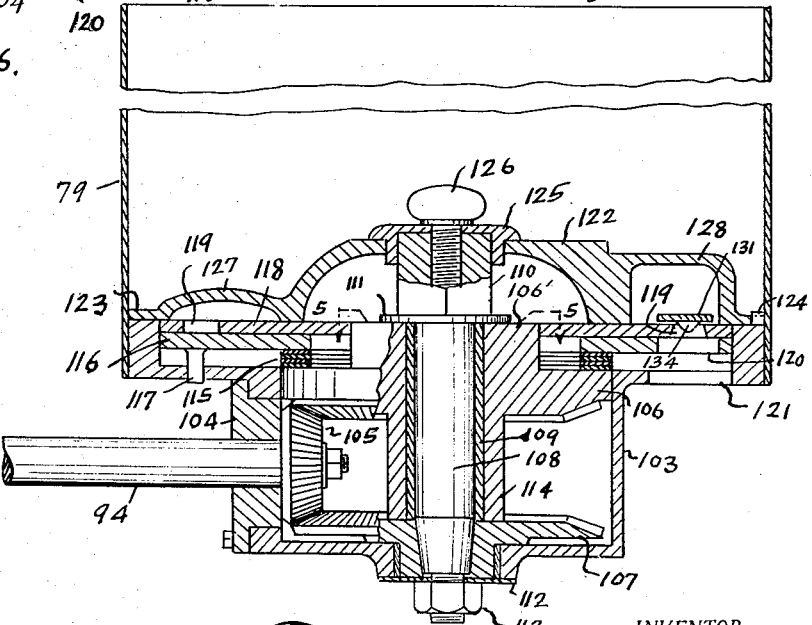
INVENTOR.
Frank J. Zalesky
BY
Hardway Cathey
ATTORNEYS

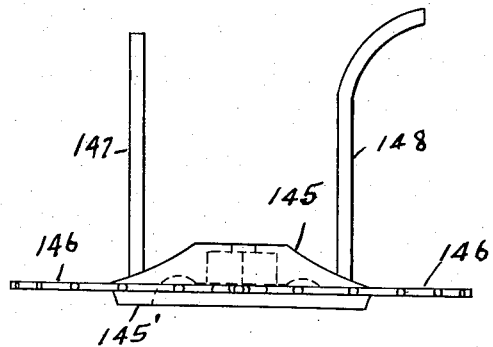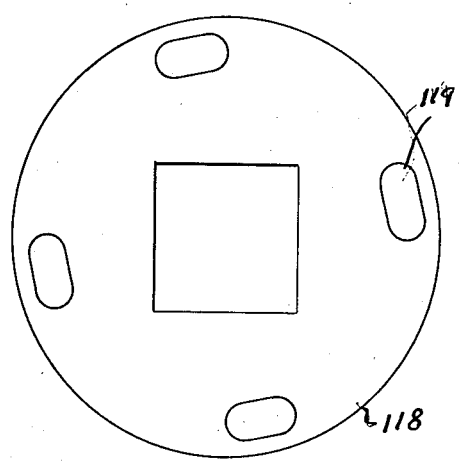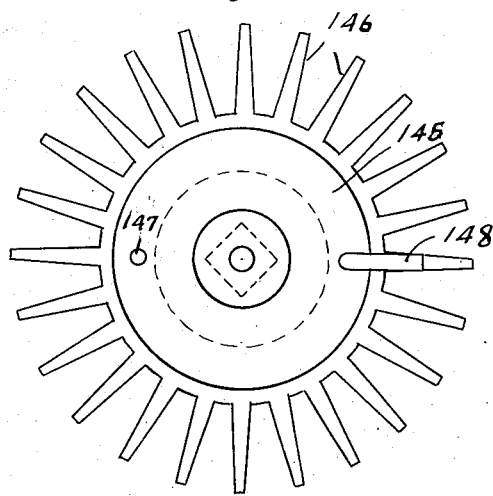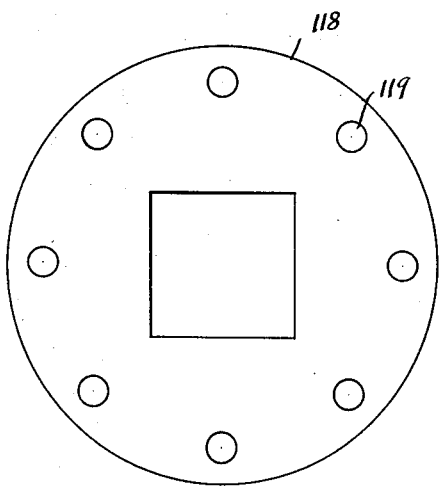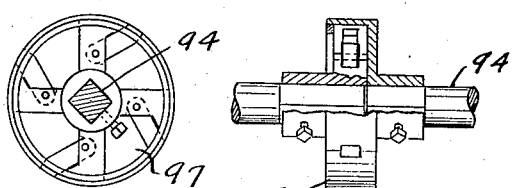

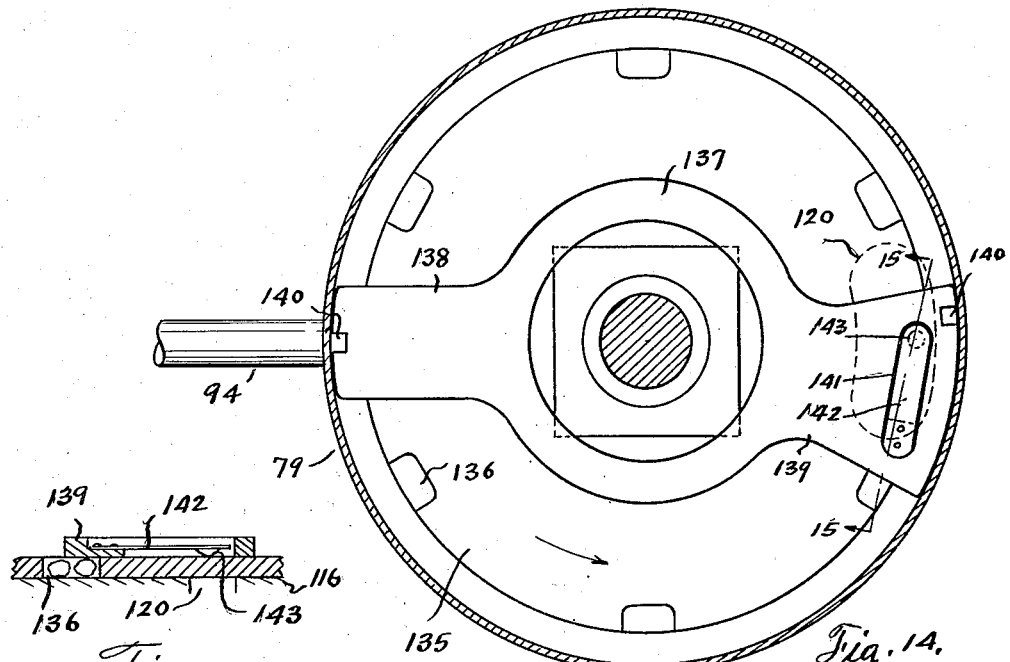
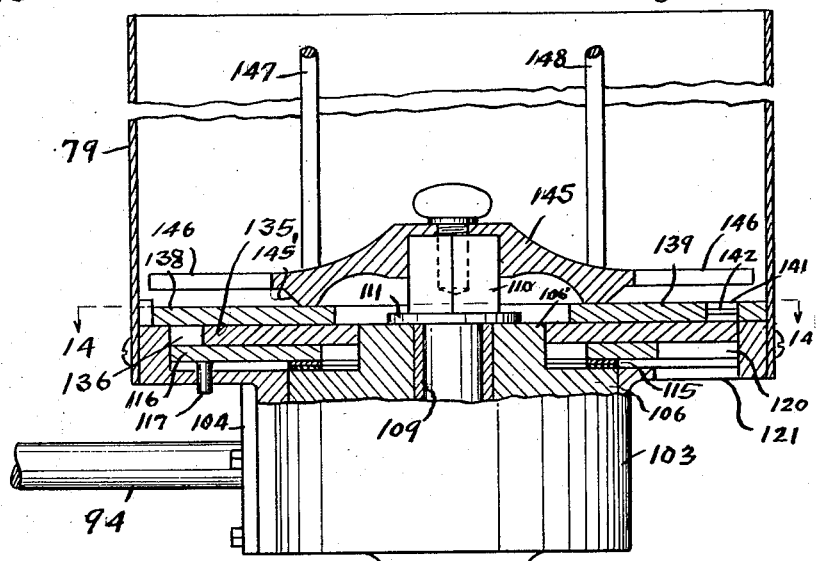

Dec. 30, 1930.　　F. J. ZALESKY　　1,787,228
AGRICULTURAL IMPLEMENT
Filed Jan. 28, 1927　　12 Sheets-Sheet 6

Inventor
Frank J. Zalesky
By Hardway & Cathey
Attorneys

Dec. 30, 1930.  F. J. ZALESKY  1,787,228
AGRICULTURAL IMPLEMENT
Filed Jan. 28, 1927  12 Sheets-Sheet 7

INVENTOR.
Frank Zalesky
BY
Hardway Cathey
ATTORNEY

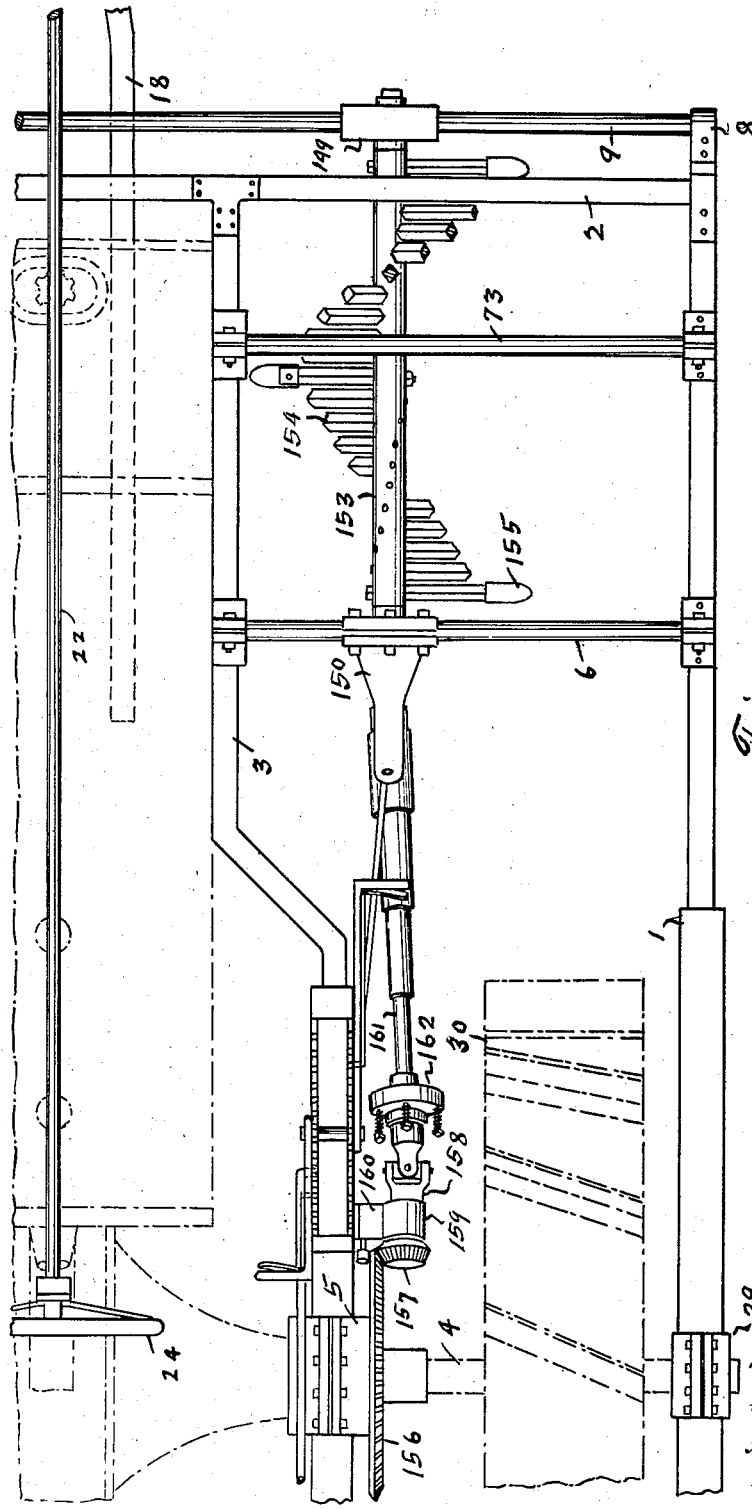

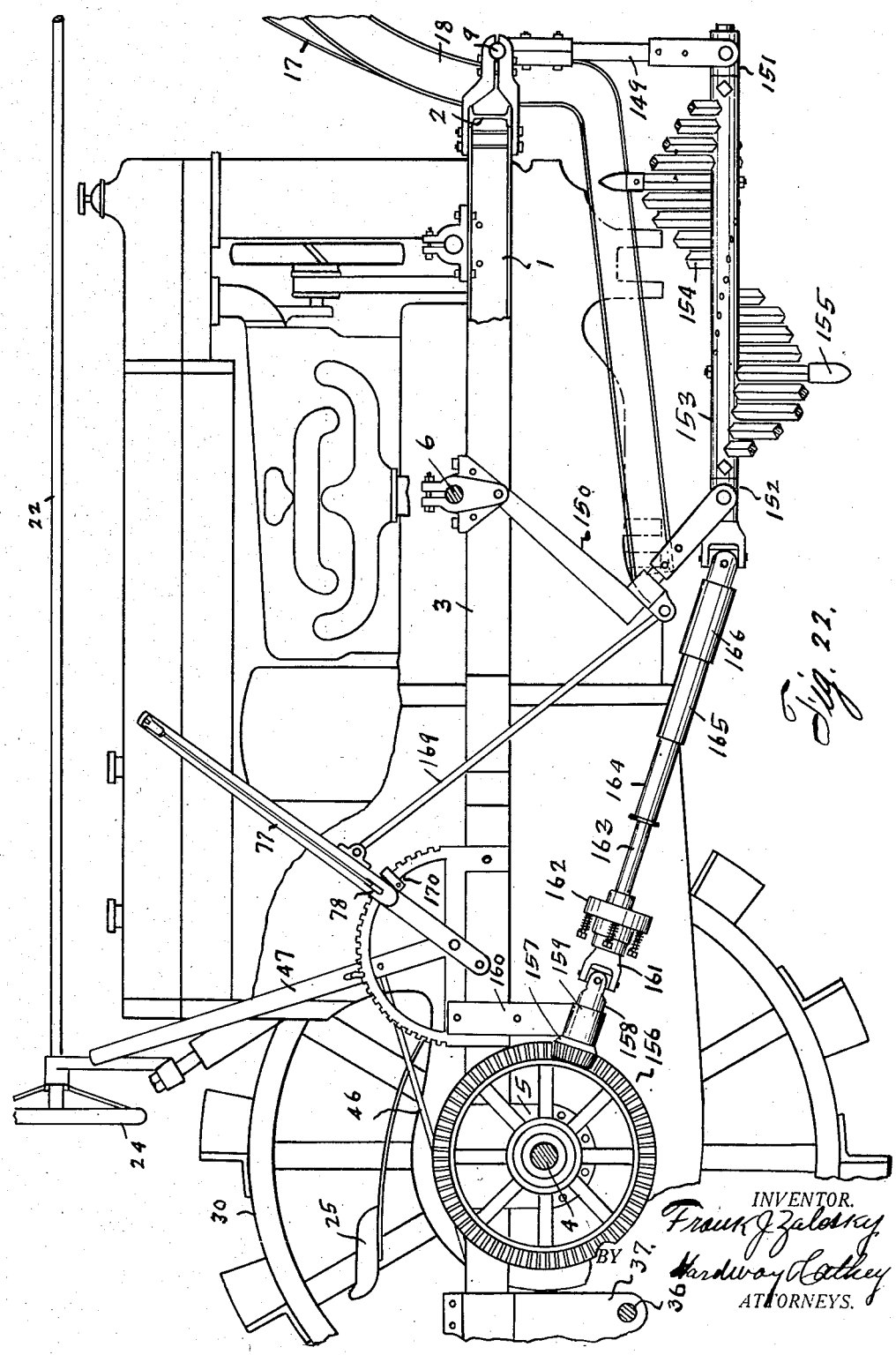

Dec. 30, 1930.  F. J. ZALESKY  1,787,228
AGRICULTURAL IMPLEMENT
Filed Jan. 28, 1927  12 Sheets-Sheet 11
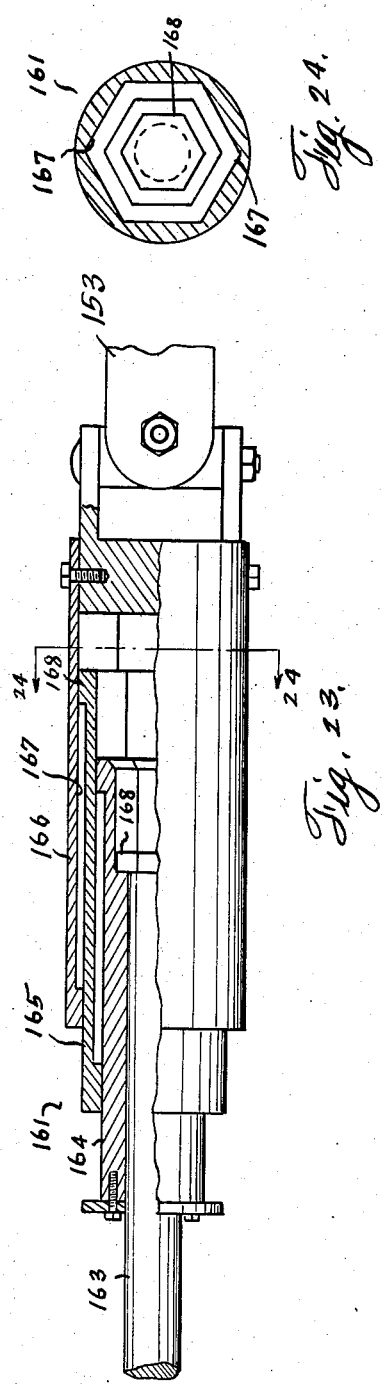
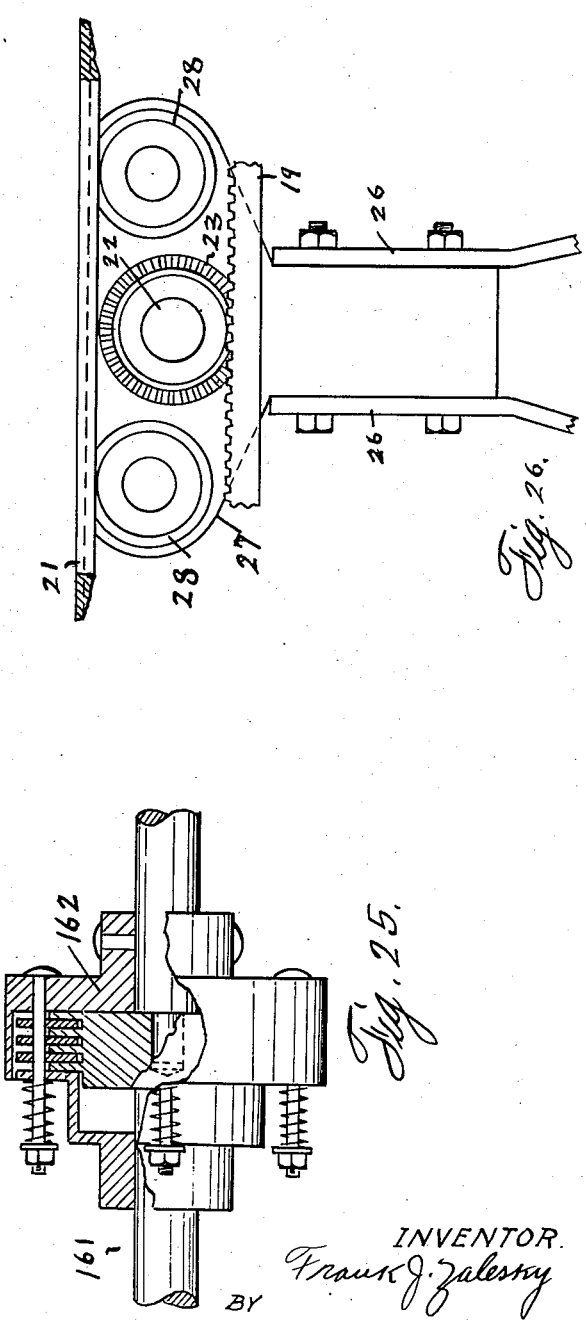
INVENTOR.
Frank J. Zalesky
BY
Hardway Cathey
ATTORNEYS Dec. 30, 1930.  F. J. ZALESKY  1,787,228
AGRICULTURAL IMPLEMENT
Filed Jan. 28, 1927     12 Sheets-Sheet 12
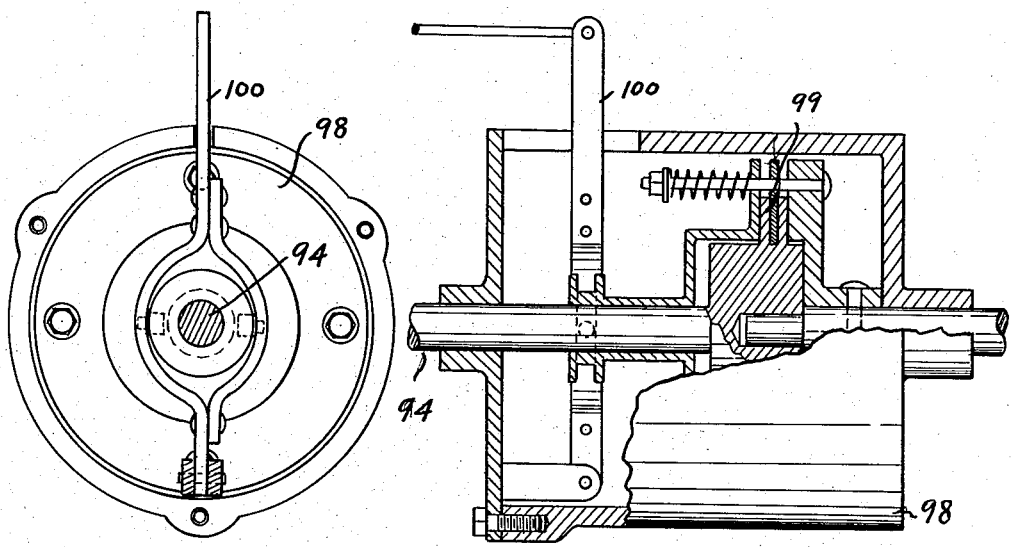
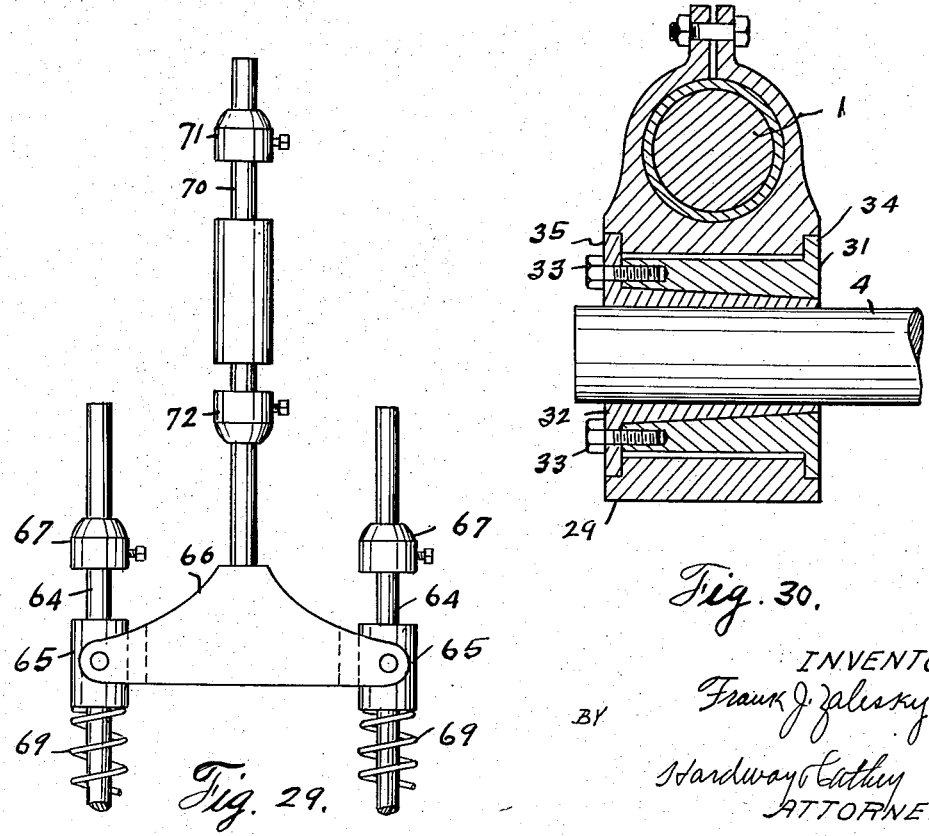
INVENTOR
Frank J. Zalesky
BY
Hardway & Cathey
ATTORNEYS Patented Dec. 30, 1930

1,787,228

UNITED STATES PATENT OFFICE

FRANK J. ZALESKY, OF BUCKHOLTS, TEXAS

AGRICULTURAL IMPLEMENT

Application filed January 28, 1927. Serial No. 164,248.

This invention relates to new and useful improvements in an agricultural implement.

One object of the invention is to provide a self propelled implement capable of performing various kinds of agricultural work such as preparing the ground and planting and cultivating the crops.

Another object of the invention is to provide an implement of the character described, which is capable of planting and cultivating a plurality of rows of plants simultaneously.

A further feature of the invention resides in a novel type of planter, or seeder employed and specially designed for planting different kinds of seed.

A still further feature of the invention is to provide an agricultural implement of the character described whose parts are readily adjustable to meet the requirements of the situation.

With the above and other objects in view this invention has particular relation to certain novel features of construction, operation and arrangement of parts, an example of which is given in this specification and illustrated in the accompanying drawings, wherein:—

Figure 1 shows a fragmentary plan view of the implement showing the seed planter attached to and forming part thereof.

Figure 2 shows a fragmentary side elevation thereof.

Figure 3 shows a vertical sectional view of a planter box employed.

Figure 4 shows a plan view thereof.

Figure 5 shows a fragmentary transverse sectional view thereof taken on the line 5—5 of Figure 3.

Figure 6 shows a sectional view thereof, taken on the line 6—6 of Figure 4.

Figure 7 shows a plan view of the seed plate employed.

Figure 8 shows a plan view of another type of seed plate employed.

Figure 9 shows an edge view of the agitator plate employed.

Figure 10 shows a plan view of said agitator plate.

Figures 11 and 12 show end and side views, respectively, of the one way clutch incorporated into the planter drive shaft, the latter figure being shown partly in section.

Figure 13 shows a vertical sectional view of a cotton seed planter box.

Figure 14 shows a horizontal sectional view thereof, taken on the line 14—14 of Figure 13.

Figure 15 shows a fragmentary sectional view thereof, taken on the line 15—15 of Figure 14.

Figures 21 and 22 show fragmentary plan and side views respectively of the implement showing the plant cultivator attachment, applied thereto.

Figure 23 shows a fragmentary side view, partly in section, of a novel type of drive shaft employed.

Figure 24 shows a cross sectional view thereof, taken on the line 24—24 of Figure 23.

Figure 25 shows a side elevation, partly in section, of a type of slip clutch employed.

Figure 26 shows a fragmentary rear view, partly in section, of the steering mechanism taken on the line 26—26 of Figure 2.

Figure 27 shows a side elevation, partly in section, of another form of clutch employed.

Figure 28 shows an end view of said clutch, showing the rear end plate removed and the driving shaft shown in section.

Figure 29 shows a fragmentary rear view of a yoke from which the side cultivators are suspended, taken on the line 29—29 of Figure 2, and Figure 30 shows a fragmentary sectional view taken on the line 30—30 of Figure 18.

Figure 16:
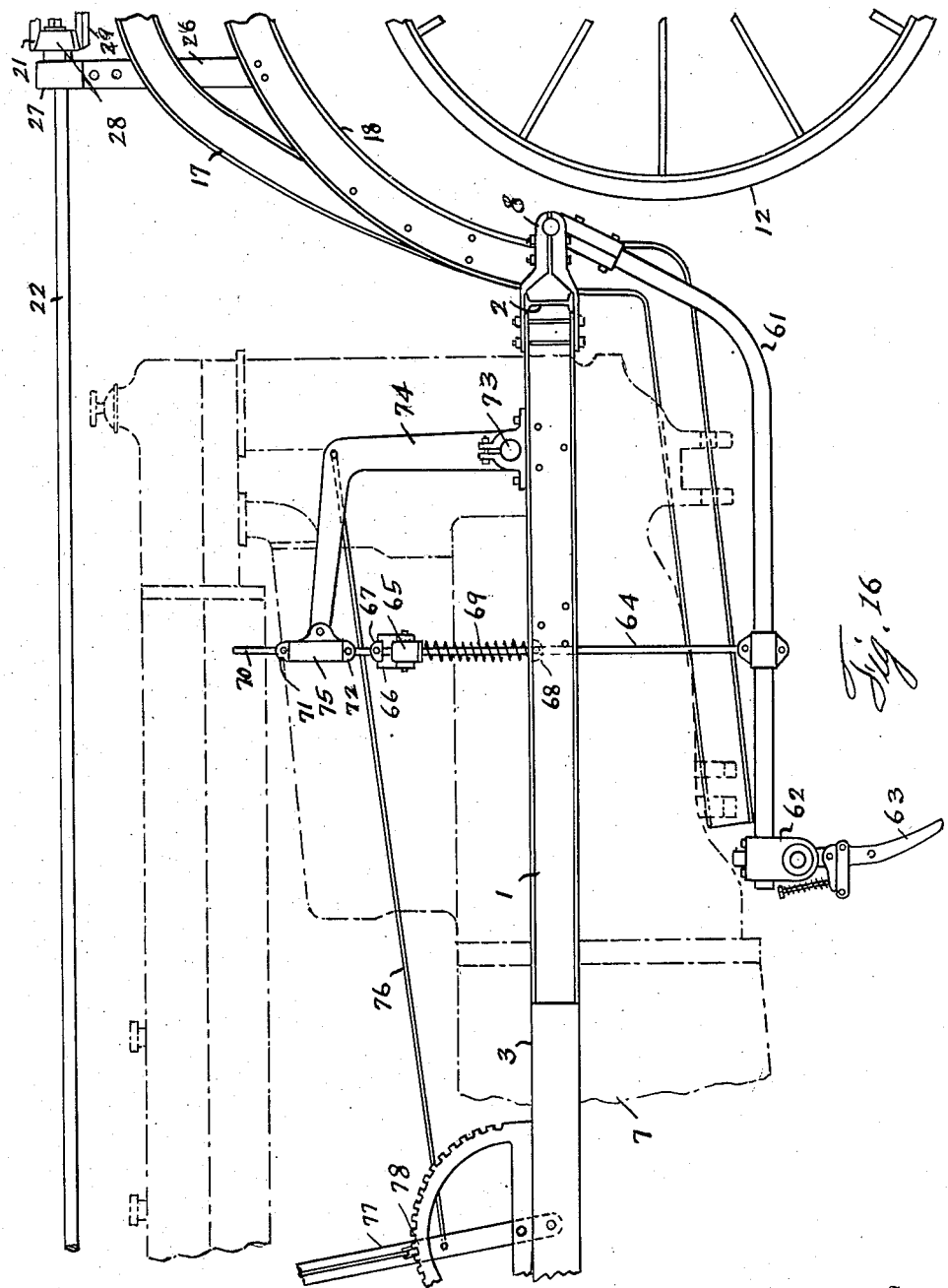
Figure 16 shows a fragmentary side view of the implement showing one of the cultivator attachments thereof.

Referring now more particularly to the drawings, wherein like numerals of reference designate similar parts in each of the figures, the numerals 1, 1, designate the side members of the main frame which are anchored at their forward ends to the front cross bar 2. The numerals 3, 3, designate the side members of a supplemental frame and have their forward ends anchored to said cross bar 2 and their rear ends supported on the housing of the axle 4 of the tractor by means of suitable bearings 5, 5, which fit on and are secured to the ends of said housing. The corresponding side members of the main frame, and supplemental frame are suitably anchored together by means of the cross braces as 6, 6, and the crank case 7 of the tractor is anchored to and located between the supplemental frame members.

The parts of the framework hereinbefore described are preferably, though not necessarily, formed of I-beams.

The forward ends of the side members 1 have bearings, as 8, in which a transverse shaft 9 is mounted and the rear ends of the side members 1 and 3 have transversely aligned bearings 10 in which the transverse shaft 11 is mounted.

There is a front guide wheel 12 mounted to rotate between the legs 13, of the steering fork 14, and the stem 15, of this fork is rotatable in the vertically aligned bearings 16, 16, carried by the forward ends of the forwardly extending guide arms 17, 18. The rear ends of these arms are anchored to the crank case 7 and they extend underneath the front cross bar 2 and are upwardly curved as shown, and they support the front end of the implement on the guide wheel 12.

The upper end of the stem 15 has a beveled segmental rack member 19 fixed thereon and spaced above it and fixed thereto by the brackets 20 there is a beveled segmental track 21.

There is a steering rod 22 and a beveled pinion 23 is fixed on the front end of said rod and in mesh with the rack member 19 and fixed to the rear end of this rod there is a steering wheel 24 conveniently located in front of the driver's seat 25.

Upstanding from the arms 17 and 18, adjacent the rear side of the rack member 19, are the standards 26, 26, and clamped between their upper ends there is a yoke 27 in which the rod 22 has a bearing and on opposite sides of said bearing the yoke has the beveled rollers 28, 28, which ride against the beveled under side of the track 21 so as to hold the pinion 23 in secure mesh with the rack 19. By rotating the rod 22 the course of the guide wheel 12 may be varied and the implement accordingly steered.

The rear end of the implement is supported on the axle 4 which is mounted to rotate, not only in the bearings 5, but also in the bearings 29 which are fixed to and depend from the respective side members 3 and 1. The tractor wheels 20 are fixed on the rear axle inside of the side members 1 and the bearings in which said axle runs are similar and one of them is illustrated in cross section in Figure 30. Each of these bearings has a spool-like liner composed of the tapering outer and inner sections 31 and 32 which are secured together by the set bolts 33 with their end flanges 34, 35, clamping the bearing 29 or 5, as the case may be, between them.

Between the side members 3, of the supplemental frame and near the rear end thereof, there is a transverse rod 36, which is supported by the bearings 37 clamped to and depending from said side members, and the side members 1 have the depending bearings 37' clamped thereto, and the hanger arms 38 have bearings on said rod 36. There are also hanger arms 38' whose forward ends are bifurcated and embrace the depending extensions of the bearings 37' and are pivotally connected thereto. The hanger arms 38 and 38' respectively extend rearwardly, as shown. Fixed to the shaft 11 and extending rearwardly are the lift arms 39 whose rear ends have the vertical bearings 40 hinged thereto. The lift rods 41 are pivotally connected, at their lower ends, to the arms 38, 38' and work through the corresponding bearings 40. These rods have the upper and lower stops 42, 43 thereon above and beneath the bearings 40, respectively, and the coil springs 44 surround the rods 41 and are interposed between the stops 43 and the corresponding bearings 40. Fixed to and depending from the rod 11 there is an arm 45 to the lower end of which the rear end of the link 46 is pivotally connected. The forward end of this link is pivotally connected to the manual lever 47 which is pivoted to and upstands from the adjacent side member 3. Through the manipulation of this lever the lift arms 38, 38', and the tools suspended therefrom, may be elevated and lowered. Associated with the lever 47 there is the conventional rack-and-dog arrangement 48 by means of which said lever and the lift arms 38, 38' controlled thereby, may be locked in any selected position. The springs 44 operate to hold the tools, carried by the arms 38, 38' and hereinafter referred to, yieldingly against the ground.

Figures 17, 18:
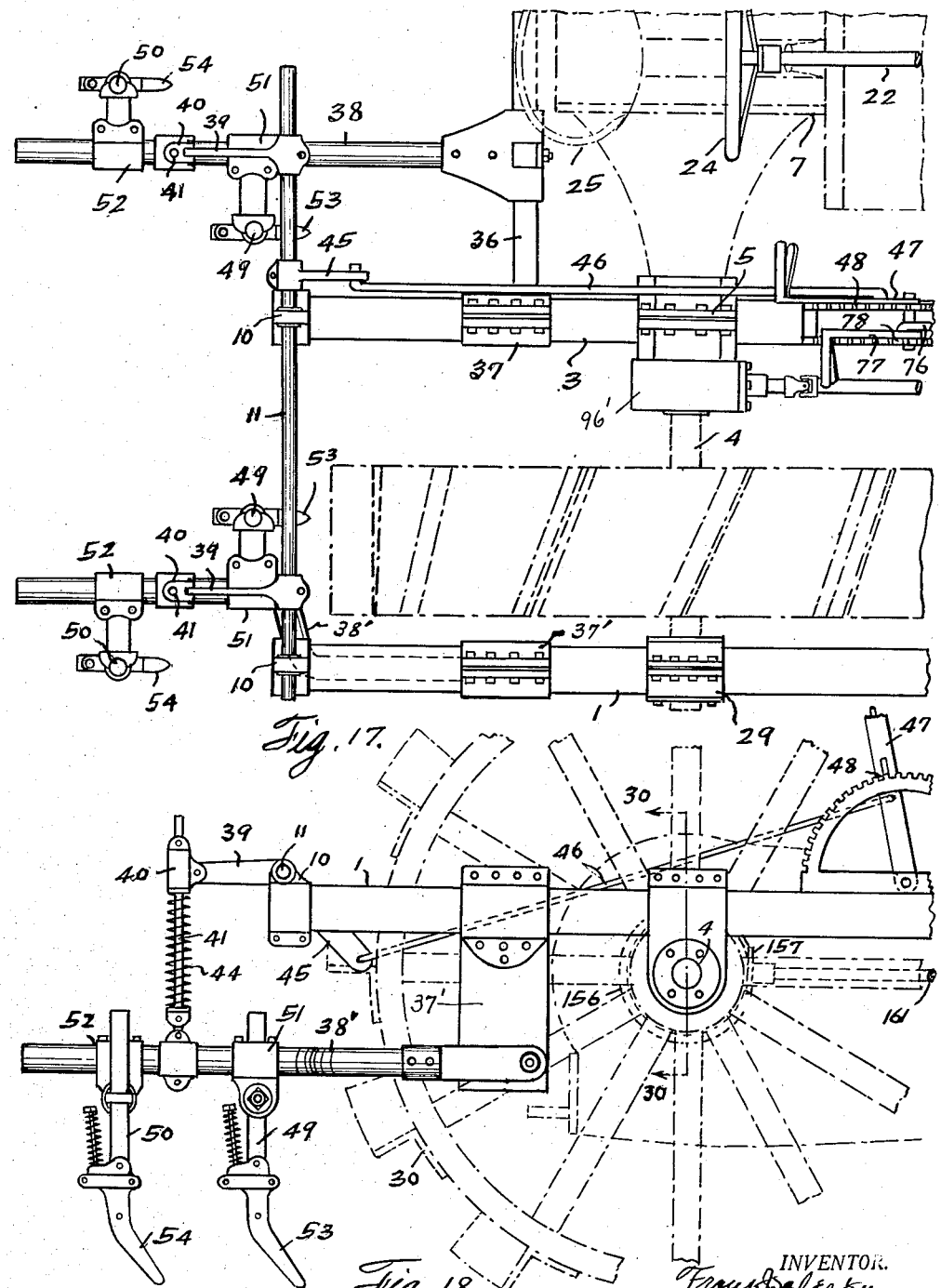
Figures 17 and 18 show fragmentary plan and side views, respectively, of the apparatus, showing the rear cultivator attachments applied thereto.

As shown in Figures 17 and 18 share stocks 49, 50 are fixed to the lift arms 38, 38', by means of the brackets 51, 52, and depend therefrom and these stocks have the usual cultivating shares 53, 53 yieldingly hinged thereto.

Figure 19:
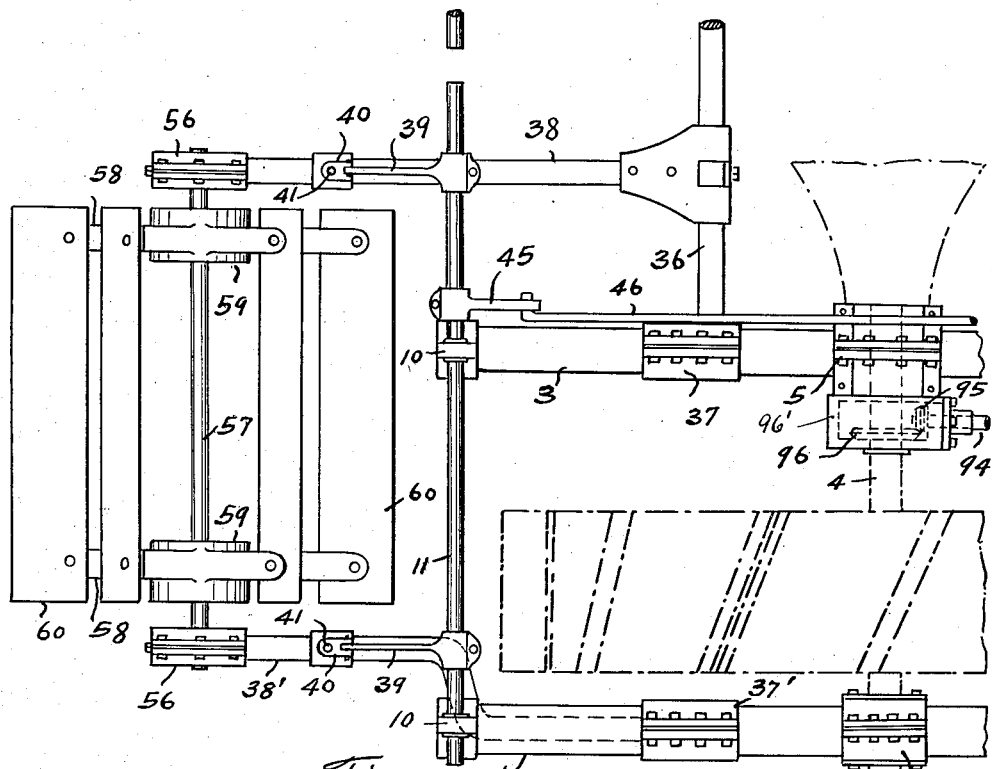
Figures 19 and 20 show fragmentary plan and side views, respectively, of the implement showing the stalk cutter attachment applied thereto.
Figure 20:
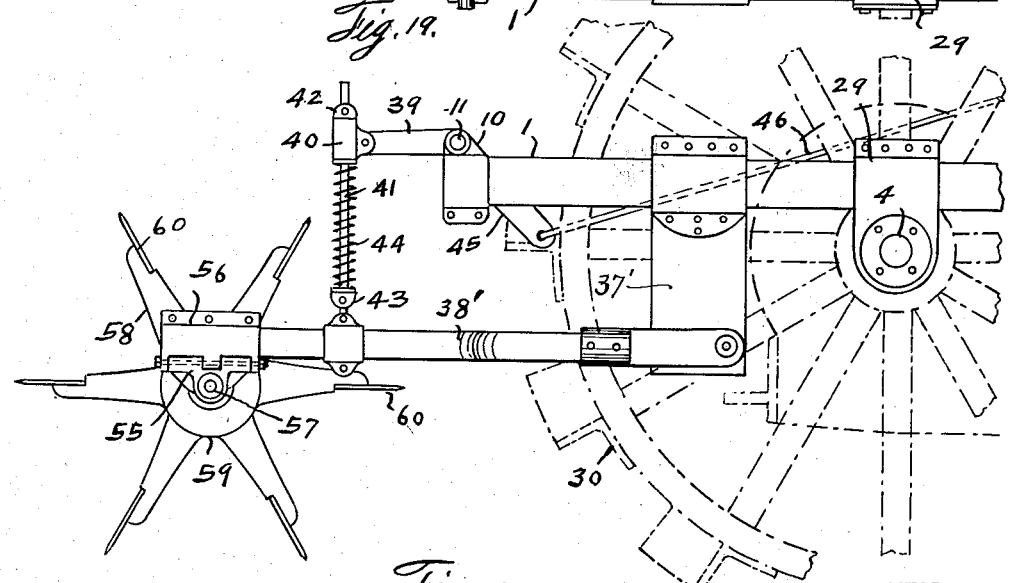

In the form shown in Figures 19 and 20 the lift arms 38, 38' have the rear end bearings 55, 55, hinged to the clamps 56, 56, which are secured to said rear ends and a transverse cutter shaft 57 has its ends journaled in said bearings 55. This shaft 57 has the respective pairs of arms 58, 58, which radiate from the hubs 59, fixed on said shaft, and each pair of arms 58 has a transverse cutter blade 60 secured thereto and adapted to operate against the ground surface. These cutters are provided particularly for the purpose of cutting the stalks from rows, and while only one cutter is shown in the figures there will be one on each side of the implement so that two rows of stalks can be simultaneously cut away. Likewise the cultivating shares 53, 54, will be arranged on each side of the implement, those on one side only being shown in Figures 17 and 18.

As shown in Figures 1, 2 and 16 there are the spaced share stocks 61, 61, whose forward ends have bearings on the rod 9 and extend rearwardly therefrom. Fixed on the rear ends of these stocks 61 are the brackets 62 to which the shares 63 are yieldingly hinged. These shares are to be used either for planting or cultivating, and all of the side shares shown may be employed in conjunction with the stalk cutting attachment above described.

Pivotally connected to each stock 61 there is an upstanding hanger rod 64. These rods are vertically slidable through the bearings 65 carried by and having a swiveling connection with the yoke 66. The rods 64 have the upper and lower fixed stops 67 and 68 respectively thereon, above and below the corresponding bearings 65 and a coil spring 69 surrounds each rod 64 and is interposed between the stop 68 thereof and the corresponding bearing 65. The yoke 66 has an upstanding hanger rod 70 attached thereto and adjustably secured to said rod 70 are the upper and lower spaced stops 71 and 72. There is a short transverse shaft 73 mounted in suitable bearings carried by the respective side members 1 and 3, and in the form shown in Figure 16 there is a lift arm 74, fixed to and upstanding from the shaft 73 whose upper end is rearwardly turned and pivotally connected to a bearing 75 between the stops 71 and 72 and through which the rod 70 extends. There is a link 76 whose forward end is pivotally connected to the lift arm 74 and whose rear end is pivotally connected to the manual lever 77 whose lower end is pivoted to the adjacent side member 3. By the manipulation of the lever 77 the arm 74 may be correspondingly moved and the corresponding stocks 61, and the shares carried thereby elevated or lowered. Associated with the lever 77 there is a conventional rack-and-dog arrangement 78 through which said lever 77 and the mechanism controlled thereby may be locked in a selected position. The shares carried by the stock 61 are held yieldingly against the ground by means of the springs 69. It is to be here also noted that the stocks 61 and the shares carried thereby, as well as the means for operating them are arranged on each side of the implement, those on one side only being shown.

In the form shown in Figures 1 and 2 there is shown, generally, a planter attachment which will be here generally described and more specifically described hereinafter. The numeral 79 designates the planter box, one being on each side of the implement. Each box 79 is maintained in fixed position by means of a suitable bracket 80 which is supported by the respective side members 1 and 3 between which the box is located. In front of each box 79 are the substantially circular vertical side plates 81, 81, spaced apart and suitably supported by the brace 6 and shaft 73. Vertically movable between these plates there is a share stock 82 fixed to the lower end of which there is a share 83 for making a furrow in advance of the planter in which the seed may be planted and it is to be noted that the shares 63 follow the planter on each side of the furrow made by the share 83 and will cover the seed deposited in said furrow. The stock 82 runs between the bearing rollers 84, and 85, 85, arranged between the plates 81 and located in front and rear, respectively, of the stock 82. The upper end of the stock 82 has a rearwardly extending arm 86 whose rear end is formed with a bearing 87 between the stops 71, 72, and through which, in this form, the rod 70 works. The forward side of the stock 82 is formed with a rack face 88 and there is a segmental rack member 89 pivotally mounted between the plates 81 and in mesh with the face 88 and this rack member has an upstanding arm 90 to the upper end of which, in this instance, the forward end of the link 76 is pivotally connected. There is a bracket 91 adjustably connected to the lower end of the stock 82, in the rear of which there is attached a share 92 which runs immediately in front of the planter boot 93 so as to clear the furrow for the deposit of the seed. By manipulating the lever 77 the share 83 may be lifted and lowered and locked in a selected position, through the mechanism described, and the shares depending from the stocks 61 may be correspondingly elevated and lowered and locked in a selected position.

The planter mechanism is driven through a shaft 94 whose rear end has a beveled pinion 95 fixed thereon and in mesh with and driven by a bevel gear 96 fixed on the rear axle 4, and enclosed by a housing 96' attached to the corresponding bearing 5. Incorporated into the shaft 94 there is a one way clutch 97 of conventional construction which operatively connects adjacent sections of the shaft 94 while the implement is moving forwardly and transmits rotation from the driving section of the shaft to the driven section thereof and to the planter, but which disengages when the implement is moved rearwardly, so that the planter will not be operated during such rearward movement. There is also a friction clutch 98 adapted to operatively clutch together, and disengage adjacent sections of said shaft 94. This clutch is of the multiple disc type having friction discs as 99, which are normally held in frictional contact in the usual and well known manner, but which may be released, or disengaged, through the clutch lever 100. The upper end of this lever is connected to the downwardly extended end 101 of the lever 77 through the connecting link 102, to the end that when the lever 77 is manipulated to lift the shares associated with the planter to inactive position the clutch 98 will be disengaged so that the planter will not be operated and vice versa.

In Figures 3 to 6 a seed planter mechanism is shown suitable for planting various kinds of seeds, not including cotton seed. The box 79 is preferably cylindrical in form with its lower end reduced forming a gear case 103 and bolted to one side thereof there is a pinion 104 having a central bearing for the adjacent end of the shaft 94. Fixed on said end of said shaft, within said case, and bearing against said case there is a drive pinion 105. This pinion is located between, and in mesh with the upper and lower bevel gears 106 and 107, also enclosed within the gear case 103. The upper end of the gear 106 is reduced and polygonal as at 106' and the lower gear 107 is fixed on the lower end of the vertical shaft 108, which works in an axial bearing 109 in the gear 106, and whose upper end is polygonal, as at 110 and rests on an annular washer 111 which rests on the top of the last named gear. The lower end of the shaft 108 extends through the bottom 112 of the gear case and is retained in position by the nut 113, which is screwed thereon. The gear 106 has an integral depending sleeve 114 which surrounds the bearing 109 and whose lower end rides on the upper face of the gear 107. Mounted on the upper face of the upper gear 106 there is one, or more, annular washers 115 on which the annular floor plate 116, of the planter box, rests and this plate is held against rotation by means of depending studs, as 117 which fit through aligned openings in the bottom of the planter box 79. This floor 116 may be adjusted up or down by adding or removing washers 115, dispensing with the necessity of providing a number of floor plates of different thickness for seed of different sizes.

The parts of the planter mechanism, hereinbefore described, are common to the planter shown in Figures 3 to 6 inclusive, for planting seeds other than cotton seed, as well as to the form of planter illustrated in Figures 9 to 10 and 13 to 15 inclusive, specially designed for planting cotton.

Referring again to Figures 3 to 6 inclusive the numeral 118 designates the seed plate which has a central polygonal bearing designed to fit snugly on the reduced upper end 106' of the gear 106 and this plate has an annularly arranged row of perforations 119 so arranged as to successively register with the registering discharge openings 120 and 121 of the floor plate 116 and the bottom of the planter box 79 respectively as the seed plate rotates. There is a stationary guard plate 122 which has a marginal rim 123 that fits closely within the planter box 79 and rests on the outer margin of the seed plate and has marginal notches which register with and receive the lugs 124 carried by the inside of said box and which hold the guard plate against turning. This guard plate is held in position by means of a round cap 125, which fits through a bearing in the top of said guard plate and whose under side has a polygonal socket to receive the correspondingly shaped upper end of the shaft 108, to which said cap is secured by a thumbscrew 126. The central part and the rim of the guard plate are joined integrally together by means of the arched oppositely disposed bridges 127, 128 under which the seed in the box 79 pass as the seed plate 118 rotates. Underneath the bridge 128 there is a pivotally mounted guard 129, which spans the space between the outer rim 123 and the central part of said guard plate and whose end facing the oncoming seed is downwardly curved and rides on said seed plate. This guard permits only the seed in the seed perforations 119 to pass by it. The inner end 130 of this guard is upturned and underneath the bridge 128 there is a kick out finger 131 whose end 132 adjacent the guard 129 is upturned and said guard and finger are held yieldingly against the seed plate by means of a coil spring 133 interposed between said upturned ends. The underside of the finger 131 has a boss 134 which registers with the seed perforations 119 successively, as the seed plate rotates and knocks the seed in said perforations out of them and the seed falls out through the registering perforations 120, 121 underneath. The seed plate 118 may be provided with perforations of any required size or shape depending on the size, shape, or number of seed to be planted, thus requiring a set of seed plates with different sizes and shapes of perforations depending on the nature of the seed.

In this form of the planter, both upper and lower gears 106 and 107 are driven from the pinion 105, but in opposite directions but the gear 107 and its shaft 108 run idly, while the seed plate 118 is driven from the gear 106.

Referring to Figures 9, 10 and 13 to 15 inclusive the numeral 135 designates the seed plate which has the marginal notches 136 to receive and carry the seed around over the discharge openings 120, 121, and this plate 135 has a central polygonal bearing to receive the correspondingly shaped upper end 106' of the gear 106 by which gear said seed plate 135 is rotated. There is an annular guard ring 137 which lies on the seed plate and which has the oppositely disposed bridges 138, 139 which lie on said seed plate whose ends have notches to receive the lugs 140 carried by the inner wall of the planter box and which hold said ring 137 and the bridges thereof against turning.

The bridge 139 has an oblong slot 141 therein and a flexible tongue 142 has its end, toward the oncoming seed, fastened to the upper side of said bridge 139 and said tongue works in said slot 141. The underside of the free end of said tongue carries a boss 143 which rides on the upper side of the plate 135 and registers, successively, with the notches 136 of the plate 135, as said plate rotates, and strikes against the seed in said notches 136 and projects them through the openings 120, 121 and they pass down through the seed chute 144 and boot 93 down into the furrow. The notches 136 may be made of any required size depending on the size or number of seed to be planted.

There is a disc-like agitator 145, whose underside has an annular rim 145' which runs on the guard ring 137 and also has a central polygonal socket which receives the upper end 110 of the shaft 108 and said agitator is turned with said shaft in a direction the opposite of the rotation of the seed plate 135. The agitator has the radial fingers 146 which sweep through the cotton seed to prevent the congestion thereof and to cause the same to feed down onto the seed plate. Cotton seed carries a certain amount of adhering lint which has a tendency to cause the seed to congest and hang together, hence the necessity of the agitation thereof. Upstanding from the agitator 145 are the stirrer arms 147, 148, which stir the seed in the upper part of the planter box to cause the same to feed down within the range of the agitator and the latter arm is outwardly turned so as to sweep around the walls of the planter box.

In Figures 21 to 25 inclusive there is shown an attachment for cultivating a row of plants and chopping out surplus plants from the row. One of these cultivating attachments will be located on each side of the implement but only one is shown in the drawings.

Pivotally connected to the rods 9 and 6 respectively, and depending therefrom, are the front and rear hangers 149, 150 whose lower ends carry the swiveling bearings 151, 152 and rotatably mounted in these bearings there is a longitudinal shaft 153. This shaft carries a plurality of share stocks 154 which project out radially therefrom and are arranged in a spiralled row. The outer ends of these stocks carry suitable shares 155. These shares pass transversely through the row, as the shaft 153 rotates, and the shares are so spaced apart that as the machine moves forwardly certain plants located a uniform distance apart will be cut out of the row and the others left standing and cultivated. Fixed on the axle 4 there is a relatively large bevel gear 156 which is in mesh with and drives the pinion 157 which is fixed on the stub shaft 158. This stub shaft is rotatable in a bearing 159 carried by the hanger 160 which in turn is secured to the adjacent side member 3. There is a drive shaft, designated generally by the numeral 161, which is connected by universal joints to the respective shafts 153 and 158 and drives the former from the latter. This shaft embodies a multiple disc slip-clutch 162, of conventional construction. This shaft is formed of telescoping sections 163, 164, 165 and 166, telescopically arranged, as shown in Figures 23, and 24. Each telescoped section is square, or polygonal on the inside, as at 167, and each telescoping section has the external, square or polygonal head, as 168 adapted to key into the corresponding telescoped section to clutch the sections in driving relation. The shaft 153 may be elevated or lowered through the lever 77 which is connected, in this instance, to the hanger 150 through the link 169 and which may be locked in any selected position, through the rack-and-dog arrangement 78. The said rack may be provided with an adjustable stop 170 in front of the lever 77 to limit the forward movement of said lever and consequently limit the depth at which the shares 155 may run.

In case the shares 155 strike an obstruction the clutch 162 will slip to prevent breakage of any of the parts and in case it is desired to swing the shares 155 upwardly the lever 77 may be pulled rearwardly which will operate through the link 169 to elevate said shares. When the shares are elevated the sections of the shaft 161 will be collapsed and the head 168 of the section 163 will move beyond the end of the section 164 and said sections will be declutched and the shaft 153 will not rotate when in elevated position.

With this type of row cultivator, shown in Figures 21 and 22 the rear cultivators, shown in Figures 17 and 18 may be used to cultivate between the rows, and the other planting and cultivating attachments removed.

When the planter equipment is in use the stalk cutting attachments and row cultivating attachment may be removed; for general cultivating purposes the stalk cutter, row cultivator and planter attachments are removed and only the rear and side cultivating shares are employed; and when the implement is used for cutting stalks the planter and row cultivator attachments, as well as the rear shares are removed.

Any type of internal combustion motor may be employed and mounted on the framework disclosed and operatively connected with the rear axle 4, in the conventional manner.

What I claim is:

1. An implement of the character described comprising tractor wheels, an axle to which said wheels are fixed, a framework supported by said axle, and including outside side members and a supplemental frame having inside side members spaced apart and spaced from the respective outside members, forwardly extending supporting means supporting the front end of the framework, a motor supported by the supplemental frame and operatively connected with said axle, ground working means supported by the framework on each side and at the rear thereof, said rear ground working means comprising bearing members, depending from said outside members, rearwardly extending hanger arms pivoted to said bearing members, stocks depending from said arms, shares yieldingly mounted on the said stocks, a rotatable shaft on said outside members, lift arms attached to said shaft, and yieldably connected to said hanger arms, and means for rocking said shaft to elevate and lower said shares.

2. An implement of the character described comprising tractor wheels, an axle to which said wheels are fixed, a framework supported by said axle and including outside side members and a supplemental frame having inside side members spaced apart and spaced from the respective outside members, forwardly extending supporting means supporting the front end of the framework, a motor supported by the supplemental frame and operatively connected with said axle, depending bearings clamped to said respective outside side members, a common rocker shaft extending entirely across the frame, hanger arms extending rearwardly from said bearings, ground working means supported by the framework on each side and also by said hanger arms, said rear ground working means being vertically adjustable through said shaft, and means for adjusting said side ground working means and for fixing the same in a selected position of adjustment, said adjusting means including a rack face and a rotatably mounted segmental rack member in mesh with said face.

3. An implement of the character described comprising tractor wheels, an axle to which said wheels are fixed, a framework supported by said axle, and including outside side members and a supplemental frame having inside side members spaced apart and spaced from the respective outside members, forwardly extending supporting means supporting the front end of the framework, a motor supported by the supplemental frame and operatively connected with said axle, ground working means supported by the framework on each side and at the rear thereof, said side ground working means including a vertically movable stock having a rack face and share carried thereby, a segmental rack member in mesh with said face, a pivotally mounted stock connected to the vertically adjustable stock and shares carried thereby; a transverse rod on said inside side members, rearwardly extending hanger arms supported by and extending from said rod, depending clamp bearings carried by said outside side members, hanger rods extending rearwardly from said clamp bearings, said rear ground working means being carried by said hanger arms, a transverse rocker shaft extending entirely across said framework and connected to said hanger arms, means for rocking said shaft to adjust said hanger arms toward and from the ground surface, and means holding some of said ground working means yieldingly in working relation with the ground surface.

4. An agricultural implement including traction wheels, an axle on which said wheels are fixed, a framework supported by the axle, a guide wheel for supporting the front end of the framework, hanger arms pivotally connected to and extending rearwardly from the rear end of the framework, ground working tools supported by said arms, lift arms operatively connected with said hanger arms and supporting the same and provided with bearings, rods connected to said hanger arms and working through said bearings, yieldable members between said lift arms and hanger arms, means for elevating and lowering said lift arms and for locking the same in a selected position, said means including a common transverse rocker shaft extending entirely across the frame work.

5. An agricultural implement including traction wheels, an axle on which said wheels are fixed, a framework supported by the axle, a guide wheel supporting the front end of the framework, hanger arms pivotally connected to and extending rearwardly from said framework, ground cultivating means supported by said arms, means for holding said cultivating means yieldingly against the ground surface, said holding means including lift arms from which the hanger arms are suspended, and which are formed with bearings, rods pivoted to the hanger arms and working through said bearings, manually operable means for actuating said lift arms to elevate or lower said hanger arms, and including a single rocker shaft extending entirely across the framework and means for locking said lift arms in a selected position.

6. An agricultural implement including traction wheels, an axle on which said wheels are fixed, a framework supported by the axle, a guide wheel for supporting the front end of the framework, hanger arms pivotally connected to and extending rearwardly from the rear end of the framework, ground working tools supported by said arms, a transverse rocker shaft on the rear end of the framework, lift arms on said shaft and operatively connected with said hanger arms and supporting the same, and which are formed with bearings, rods pivoted to the hanger arms and working through said bearings, coil springs around said rods, and between the hanger arms and lift arms, connected to said shaft, means for elevating and lowering said lift arms and for locking the same in a selected position, a motor mounted in the framework and operatively connected with said axle.

7. An agricultural implement including traction wheels, an axle supported thereby, a framework supported by the axle, means for guiding the implement supporting the front end of the framework, means for driving the traction wheels, ground cultivating means on each side of said driving means and operatively connected with and driven thereby, swingable means for suspending said cultivating means from the framework and holding the same yieldably in working relation with the ground surface, means for elevating, lowering and locking said cultivating means in a selected postion.

8. An agricultural implement including traction wheels, an axle on which said wheels are fixed, a framework supported by said axle, a guide wheel supporting the front end of the framework, hanger arms pivotally connected to and extending rearwardly from the rear end of the framework, ground working tools supported by said arms, a transverse shaft rotatably mounted on said framework, lift arms fixed to said shaft and having bearings, rods operatively connected to said hanger arms and working through said bearings and supported by same, coil springs between said hanger arms and the corresponding lift arms, a manual lever, an actuating arm fixed to said shaft, a link connecting said manual lever and said actuating arm vertically movable side ground working means on each side of the frame work and pivotally mounted ground working means operatively connected to and movable with said respective side ground working means.

In testimony whereof I have signed my name to this specification.

FRANK J. ZALESKY.